United States Patent
Kunz

[11] Patent Number: 5,947,301
[45] Date of Patent: Sep. 7, 1999

[54] DEVICE FOR FILING STANDARD COMPACT DISK BOXES

[75] Inventor: Peter Kunz, Winterthur, Switzerland

[73] Assignee: Spichtig AG Kunststoffwerk Steinen, Steinen, Switzerland

[21] Appl. No.: 08/744,428

[22] Filed: Nov. 7, 1996

[30] Foreign Application Priority Data

Jan. 26, 1996 [CH] Switzerland ............................ 0212/96

[51] Int. Cl.⁶ ........................................................ A47F 7/00
[52] U.S. Cl. ..................... 211/40; 211/41.12; 206/308.1; D6/407; 248/222.12
[58] Field of Search ................................. 211/40, 41.12, 211/46; 206/308.1, 308.3, 307.15; 248/214, 311.2, 222.12; D6/407; D8/367

[56] References Cited

U.S. PATENT DOCUMENTS

| | | | |
|---|---|---|---|
| D. 31,995 | 12/1899 | Alker | D8/367 |
| D. 46,019 | 6/1914 | Cantrell et al. | D8/367 |
| D. 176,759 | 1/1956 | Frank | D8/367 |
| D. 216,359 | 12/1969 | Feurer | D8/367 |
| 2,336,802 | 12/1943 | Posner | 211/46 X |
| 2,765,793 | 10/1956 | Becker | 211/46 |
| 3,274,450 | 9/1966 | Siebold | 248/222.12 X |
| 3,298,530 | 1/1967 | Clouthier | 211/40 |
| 3,310,178 | 3/1967 | Wright | 211/40 |
| 3,323,847 | 6/1967 | Clouthier | 211/41.12 X |
| 4,333,568 | 6/1982 | Weldin | 206/387.15 |
| 4,860,897 | 8/1989 | Fowler et al | 206/444 |
| 5,135,105 | 8/1992 | Schmeisser | 206/309 |
| 5,295,622 | 3/1994 | Lorber | 211/46 X |
| 5,358,125 | 10/1994 | Blessing | 211/46 |
| 5,402,896 | 4/1995 | Gould et al. | 211/41 |
| 5,507,545 | 4/1996 | Krysiak | 248/222.12 X |

FOREIGN PATENT DOCUMENTS

| | | |
|---|---|---|
| 92 04 964 U | 6/1992 | Germany . |
| 4327203 A1 | 2/1995 | Germany . |

OTHER PUBLICATIONS

In Form, Clip 48 CD Rack Brochure, Undated.

*Primary Examiner*—Robert W. Gibson, Jr.
*Attorney, Agent, or Firm*—Morgan, Lewis & Bockius LLP

[57] ABSTRACT

Standard compact disk boxes (1) are provided on their longitudinal sides with openings. The invention uses these openings for fixing hooks or a member (12) provided with hooks (11) by means of which the boxes can be hung in a hanging file (21).

36 Claims, 3 Drawing Sheets

DEVICE FOR FILING STANDARD COMPACT DISK BOXES

TECHNICAL FIELD

The present invention relates to a device for filing standard boxes for compact disks (CDs), provided on their longitudinal sides with openings.

Apart from their original intended use as sound carriers, compact disks are increasingly used as data carriers in the computer sector. In addition, there are new requirements with respect to the filing possibilities for such boxes, particularly in the office sector.

PRIOR ART

Devices for filing or more correctly the readily accessible storage of CD boxes are known in very varied forms. They are usually racks, such as CD stands or box-like containers. DE-C2-4327203 discloses a device for filing CD boxes, in which angular box carriers are fixed in longitudinally displaceable manner to a profile rail and are pivotable with respect to the latter. The profile rail is particularly intended for fitting to a wall. U.S. Pat. No. 5,135,105 discloses a special, approximately circular CD-box, which can be provided with a hook, so that the box can be hung on a holding bar. Finally, special CD holding elements deep-drawn from a thin plastics material are known and on which the CDs are snapped on one side and which can be equipped with hooks for arranging in a filing cabinet or the like. The CDs are free on one side. There is also no possibility of using and fixing the printed cover sheet regularly inserted in standard boxes and which relates to the content of the CD.

DESCRIPTION OF THE INVENTION

The invention, as characterized in the claims, solves the problem of providing a device for filing standard boxes for compact disks (CDs), which makes skillful use of the construction of the standard boxes, which is inexpensive to manufacture, easy to handle by the user and which can be technically and optically integrated without any problems in the office sector.

Thus, the invention is characterized by hooks fixable in openings for hanging standard boxes in a hanging file.

Preferably, the hooks are shaped onto two sides of a U-shaped member, which engages round the boxes and has an elastically flexible connecting web.

In preferred manner on the inside of the side legs of the U-shaped member are shaped locking projections adapted to the openings in the boxes.

Both the hooks and the members are easily and inexpensively manufacturable in large numbers as injection mouldings from plastic.

To the extent that the width of the standard boxes does not coincide with the width of existing hanging file systems, specially adapted hanging file elements can be provided. Several rows of CDs can be easily juxtaposed in the extractable drawers of presently conventional office desks.

The possibility of fixing marking tabs provided in conjunction with the member, permits a simple, targeted refinding of the CDs in the hanging file in a standard way.

BRIEF DESCRIPTION OF THE DRAWINGS

The invention is described in greater detail hereinafter relative to embodiments and with reference to the attached perspective drawings, wherein show.

WAYS FOR IMPLEMENTING THE INVENTION

Figure 1:
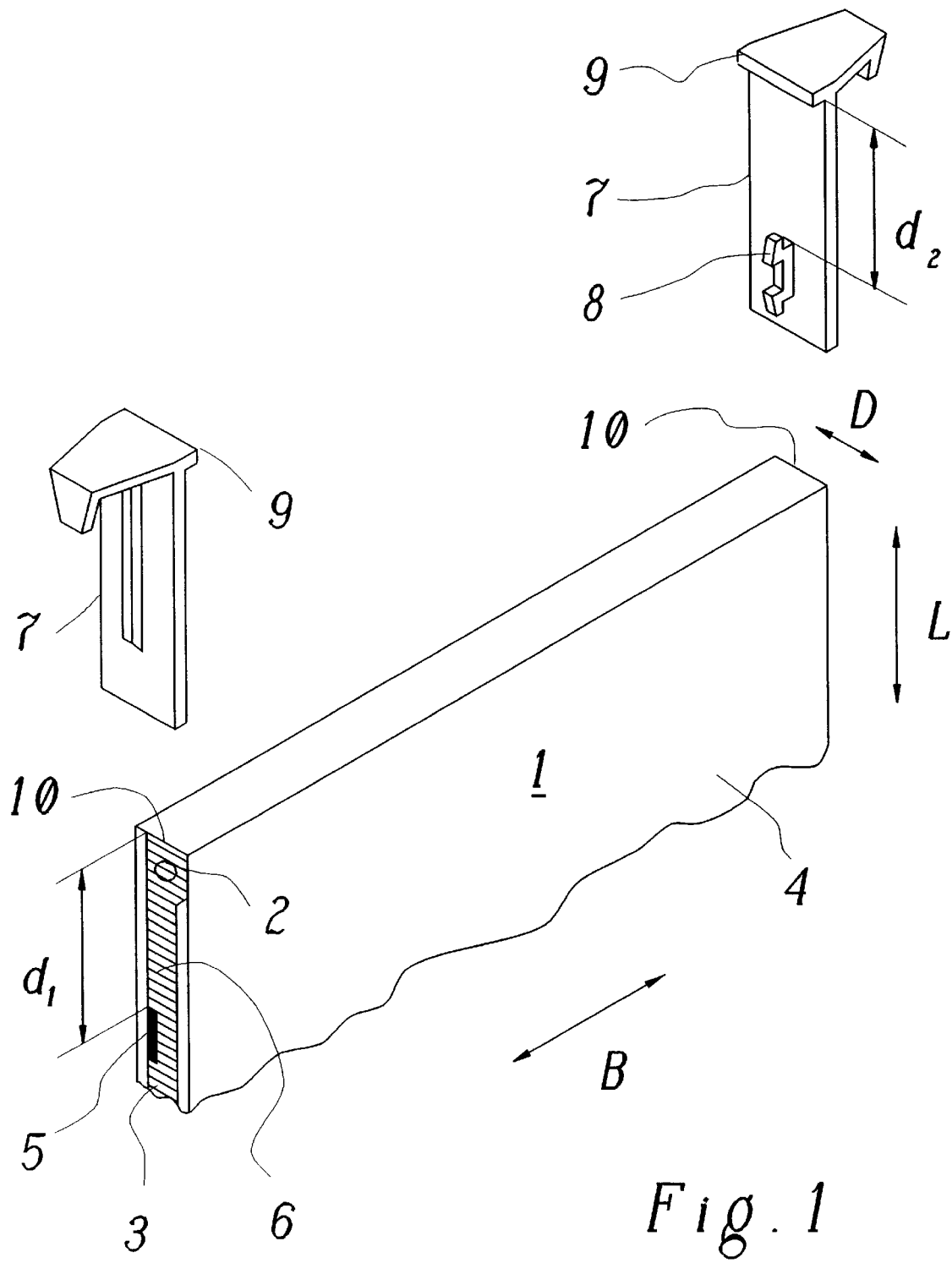
FIG. 1 A first embodiment of the invention with only two hooks.

In FIG. 1, 1 is a standard compact disk box. Such boxes are parallelepipedic and have a width B of 12.5 cm, a length L of 14.2 cm and a thickness D of 1 cm. At 2 there is a hinge, so that the lid 3 and base 4 of the box 1 can be folded open for removing or inserting a compact disk. There are elongated openings 5 in both box longitudinal sides 6 and have a distance d1 of 2.9 cm from the represented hinge end of the box 1. At the opposite, not shown opening end, there are two further such openings, but which have a distance of 1.9 cm from said end.

In the upper part of FIG. 1 there are two hooks 7, which are provided with shaped on locking brackets 8. By means of said locking brackets 8 the hooks 7 can be fixed to the box 1, the locking brackets 8 engaging and locking in the openings 5 in the box longitudinal sides. By means of a web 9, the hooks 7 in each case engage round the upper box corner 10. The web 9 consequently has a distance d2 from the locking bracket 8 corresponding to the aforementioned distance d1.

By means of the hooks 7 projecting outwards from either side, the box 1 can be hung in a standard hanging file with two parallel rails and can be moved along said rails therein. It is obvious that the hanging file rails must have a spacing corresponding to the width B of the box 1.

In the embodiment of FIG. 2 there are once again two hooks 11, but in this case they are an integral part of an approximately U-shaped member 12. Two side legs 13 are joined by means of an elastically flexible connecting web 14, which is here subdivided into two spaced webs 14a and 14b. There is a window 15 between the webs 14a and 14b. The lower web is provided with spacing ribs 16. The upper web 14b or at least its upper edge are constructed in suitable manner for the mounting of tabs 17. Preferably tabs 17 can be fitted and also fixed at different points along the web 14b. The side parts 13 are internally provided with locking projections 18. Facing the locking projections 18 there are openings 19 and viewing windows in the lower connecting web 14a.

Figure 2:
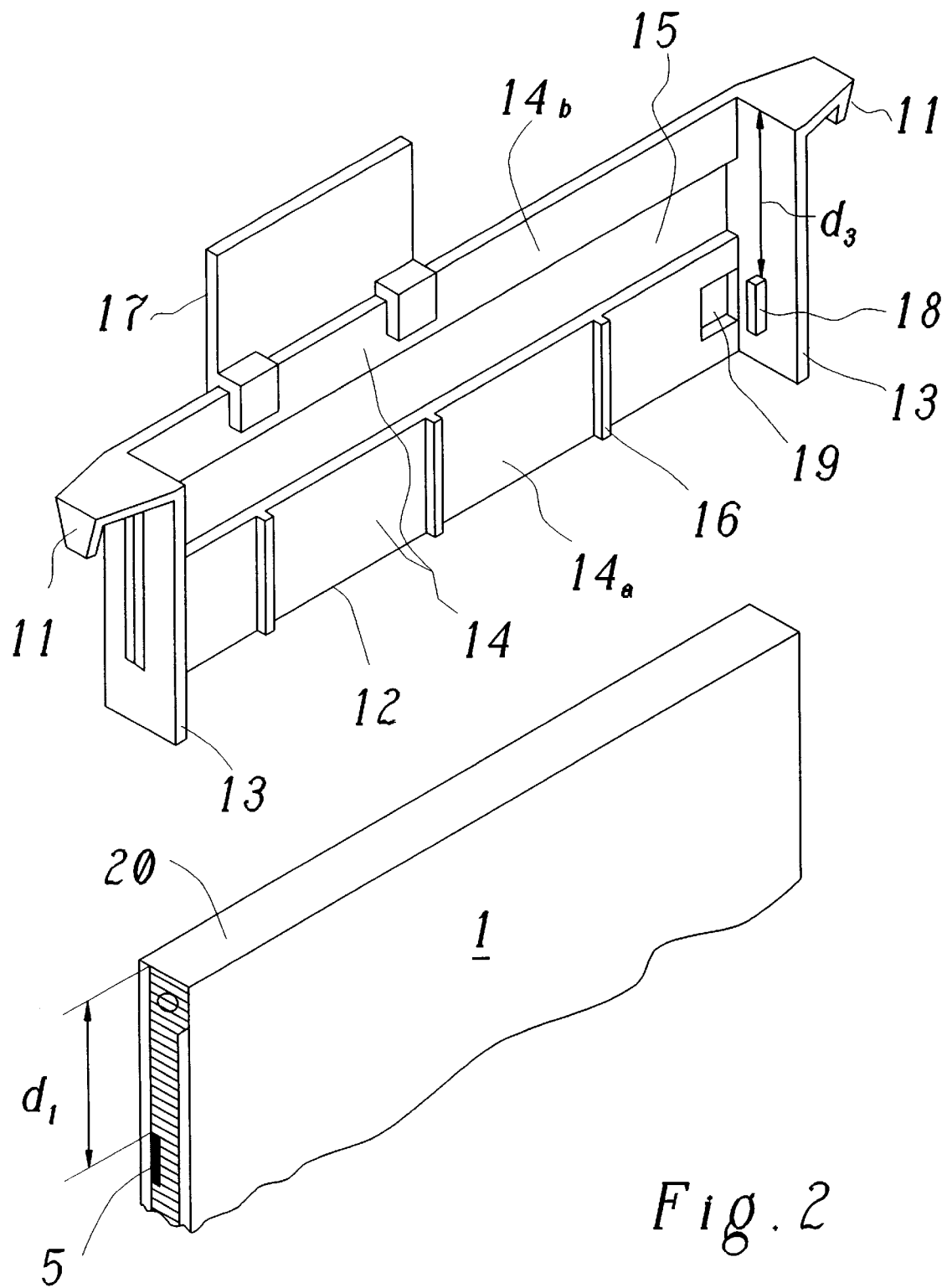
FIG. 2 A second embodiment, in which the hooks are an integral part of a member.

By means of the hook 11 the member 12 can be snapped onto the box 1, which is once again partly shown in the lower part of FIG. 2. The member 12 engages round the box 1 from the rear and the locking projections 18 engage with the box openings. Due to the spacing ribs 16 on the lower connecting web 14a, the upper connecting web 14b has the necessary spacing from the box 1 for the mounting of the tabs 17.

The locking projections 18 are displaced somewhat towards the connecting web 14 with respect to the centre of the side legs 13. As a result the member 12 can only be snapped from one side onto the box 1. The box 1 can then be opened with snapped-on member, so that the latter can constantly remain connected to the box.

The distance d3 of the locking projections 18 from the hooks 11 once again corresponds to the distance d1 of the openings 5 from the box lid 10. With the member 12 snapped on, the two hooks 11 consequently terminate roughly flush with the upper box transverse side 20, as shown in FIG. 3.

Figure 3:
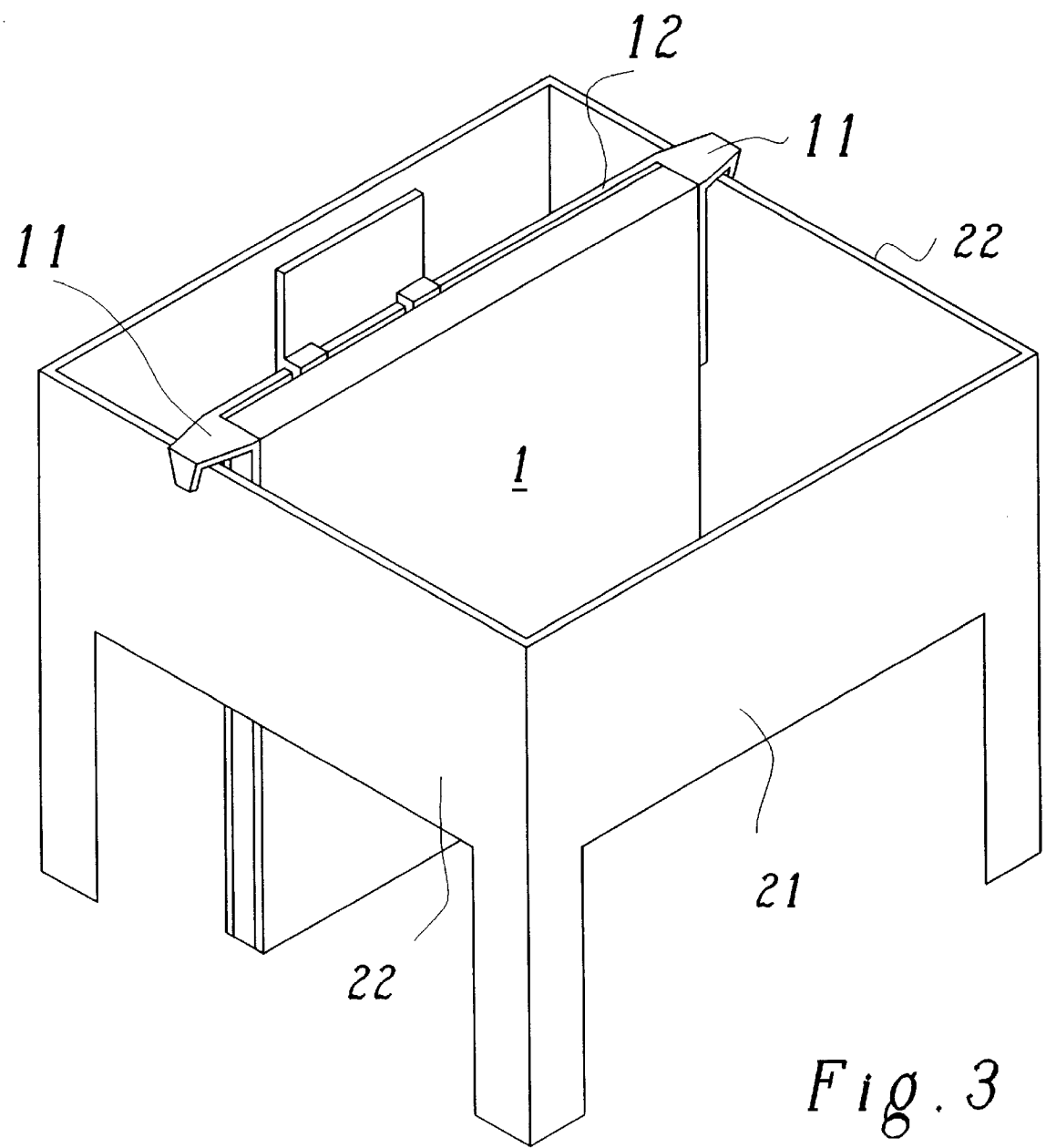
FIG. 3 A box hung by means of a member according to FIG. 2 in a hanging file element.

In FIG. 3 a box 1 is hung by means of a member 12 of the type according to FIG. 2 in a hanging file element 21. The spacing of the two side parts 22 of the element is adapted to the width B of the box 1.

I claim:

1. A device for filing standard boxes for compact disks having a plurality of openings on their longitudinal sides, the device comprising:
   a plurality of hooks fixable in the plurality of openings for hanging the standard boxes in a hanging file;
   a U-shaped member having the plurality of hooks extending outward on both sides and fixable in the plurality of openings, the plurality of openings engaging the U-shaped member; and
   an elastic flexible connecting web engaging around the standard boxes.

2. The device according to claim 1, further including locking projections on inner sides of side legs of the U-shaped member.

3. The device according to claim 2, wherein the locking projections are displaced towards the connecting web with respect to a centre of the side legs.

4. The device according to claim 2, wherein the locking projections are so far removed from the hooks that the locking projections align with a transverse side of the standard box when the locking projections are locked in the plurality of openings.

5. The device according to claim 4, wherein the connecting web further includes a first viewing window near the locking projections.

6. The device according to claim 1, wherein the connecting web has a preferably elongated second viewing window or is subdivided into two spaced connecting webs.

7. The device according to claim 1, wherein the inside of the connecting web is provided with spacing webs at least over a part of its width.

8. The device according to claim 1, wherein one of the edges of the connecting web is constructed as a rail for mounting tabs.

9. The device according to claim 1, further including a hanging file element whose width is adapted to dimensions of the standard box.

10. The device according to claim 3, wherein the locking projections are so far removed from the hooks that the locking projections align with a traverse side of the standard box when the locking projections are locked in the plurality of openings.

11. The device according to claim 3, further including a first viewing window in the connecting web near the locking projections.

12. The device according to claim 4, further including a first viewing window in the connecting web near the locking projections.

13. The device according to claim 2, wherein the connecting web has a preferably elongated second viewing window or is subdivided into two spaced connecting webs.

14. The device according to claim 3, wherein the connecting web has a preferably elongated second viewing window or is subdivided into two spaced connecting webs.

15. The device according to claim 4, wherein the connecting web has a preferably elongated second viewing window or is subdivided into two spaced connecting webs.

16. The device according to claim 5, wherein the connecting web has a preferably elongated second viewing window or is subdivided into two spaced connecting webs.

17. The device according to claim 2, wherein an inside of the connecting web of the U-shaped member includes spacing webs over at least part of its width.

18. The device according to claim 3, wherein an inside of the connecting web of the U-shaped member includes spacing webs over at least part of its width.

19. The device according to claim 4, wherein an inside of the connecting web of the U-shaped member includes spacing webs over at least part of its width.

20. The device according to claim 5, wherein an inside of the connecting web of the U-shaped member includes spacing webs over at least part of its width.

21. The device according to claim 6, wherein an inside of the connecting web of the U-shaped member includes spacing webs over at least part of its width.

22. The device according to claim 2, wherein one edge of the connecting web is constructed as a rail for mounting tabs.

23. The device according to claim 3, wherein one edge of the connecting web is constructed as a rail for mounting tabs.

24. The device according to claim 4, wherein one edge of the connecting web is constructed as a rail for mounting tabs.

25. The device according to claim 5, wherein one edge of the connecting web is constructed as a rail for mounting tabs.

26. The device according to claim 6, wherein one edge of the connecting web is constructed as a rail for mounting tabs.

27. The device according to claim 7, wherein one edge of the connecting web is constructed as a rail for mounting tabs.

28. The device according to claim 2, further including a hanging file element whose width is adapted to dimensions of the standard box.

29. The device according to claim 3, further including a hanging file element whose width is adapted to dimensions of the standard box.

30. The device according to claim 4, further including a hanging file element whose width is adapted to dimensions of the standard box.

31. The device according to claim 5, further including a hanging file element whose width is adapted to the dimensions of the standard box.

32. The device according to claim 6, further including a hanging file element whose width is adapted to dimensions of the standard box.

33. The device according to claim 7, further including a hanging file element whose width is adapted to dimensions of the standard box.

34. The device according to claim 8, further including a hanging file element whose width is adapted to dimensions of the standard box.

35. A device for filing standard boxes for compact disks having a plurality of openings on their longitudinal sides the device comprising:
   a plurality of hooks fixable in the plurality of openings for hanging the standard boxes in a hanging file, each of the plurality of hooks having a web for engaging a corner of the standard box and oriented along one side of the standard box.

36. The device according to claim 35, wherein each hook includes a locking bracket for engaging an opening of the standard box.

* * * * *